United States Patent [19]

Scherowsky et al.

[11] Patent Number: 5,352,380
[45] Date of Patent: Oct. 4, 1994

[54] FERROELECTRIC LIQUID-CRYSTALLINE POLYMERS, A PROCESS FOR THEIR PREPARATION AND THEIR USE IN ELECTROOPTICAL COMPONENTS

[75] Inventors: Günter Scherowsky; Andreas Schliwa; Wolfgang Trapp, all of Berlin, Fed. Rep. of Germany

[73] Assignee: Hoechst Aktiengesellschaft, Frankfurt am Main, Fed. Rep. of Germany

[21] Appl. No.: 170,669

[22] Filed: Dec. 17, 1993

Related U.S. Application Data

[63] Continuation of Ser. No. 635,182, Jan. 3, 1991, abandoned.

[30] Foreign Application Priority Data

Jul. 8, 1988 [DE] Fed. Rep. of Germany ....... 3823154

[51] Int. Cl.$^5$ .................. C09K 19/52; G02F 1/13; C08F 122/10
[52] U.S. Cl. ............... 252/299.01; 252/299.65; 359/104; 526/321; 526/326
[58] Field of Search .............. 252/299.01, 299.65; 428/1; 359/104; 526/321, 326, 328

[56] References Cited

U.S. PATENT DOCUMENTS

| | | | |
|---|---|---|---|
| 4,844,835 | 7/1989 | Uchida et al. | 252/299.01 |
| 4,904,065 | 2/1990 | Yuasa et al. | 359/103 |
| 5,034,153 | 7/1991 | Uchida et al. | 252/299.65 |

FOREIGN PATENT DOCUMENTS 0228703 7/1987 European Pat. Off. .

OTHER PUBLICATIONS

J. Polym. Sci. Polym. Lett. 13, p. 243 (1975).
Polym. Bull. 6, p. 309 (1982).
Phys. Rev. Lett. 38, p. 848 (1977).
Appl. Phys. Lett. 36, p. 899 (1980).

*Primary Examiner*—Shean Wu
*Attorney, Agent, or Firm*—Curtis, Morris & Safford

[57] ABSTRACT

A ferroelectric, liquid-crystalline polymer is composed of repeating units of the formula I

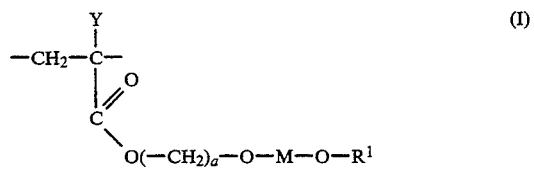

in which
Y = H or $CH_3$
a = an integer from 6 to 12
M = a group selected from the formulae which follow:

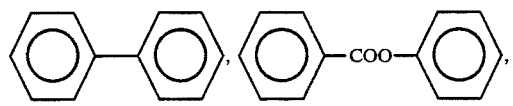

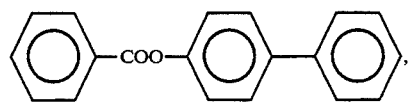

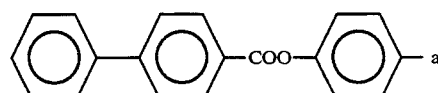

and

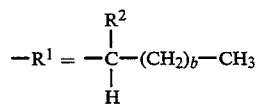

in which $-R^2 = -CH_3$ or $-Cl$ and b = an integer from 1 to 10.

The abovementioned polymer has remarkably short response times. The polymer forms, alone or mixed with other LC components, an orthogonal smectic phase. It is possible to use this phase in the electroclinic mode.

2 Claims, No Drawings

FERROELECTRIC LIQUID-CRYSTALLINE POLYMERS, A PROCESS FOR THEIR PREPARATION AND THEIR USE IN ELECTROOPTICAL COMPONENTS

This application is a continuation of application Ser. No. 07/635,182, filed Jan. 3, 1991, now abandoned.

BACKGROUND OF THE INVENTION

Liquid crystals have recently come into use in a variety of technical fields in which there is a requirement for certain electrooptical properties (for example low triggering voltages) combined with certain requirements concerning display or switching devices (for example flat construction, low weight). These devices currently utilize dielectric alignment effects in nematic, cholesteric and/or smectic liquid-crystal phases, the light transparency or reflectivity of the device being dependent on the electrical voltage applied.

A liquid-crystal display consists of two supporting plates, preferably glass plates, which are coated with transparent electrodes and, as a rule, with one or two alignment layers between which the liquid-crystal layer is located. Other components such as polarizers, color filters, passivating layers, anti-reflection layers, diffusion barrier layers and the like are in common use.

Although currently nematic or cholesteric liquid-crystal phases are still predominantly used, for some years ferroelectric, in particular smectic C*, liquid-crystal phases have been gaining in importance.

Ferroelectric liquid crystals have the advantage of very short response times and allow high-resolution screens to be operated without the assistance of electronic elements, such as for example thin-layer transistors, which are necessary when using nematic or cholesteric liquid-crystal phases.

In all the above applications, the liquid crystals are low-molecular-weight liquid-crystalline compounds, i.e. having molecular weights of below 2000 g/mol, preferably below 800 g/mol, and in particular they are not polymers, copolymers, polycondensates or copolycondensates. Owing to their low viscosity, low-molecular-weight liquid crystals generally have the advantage of short response times; this is particularly true of ferroelectric liquid crystals, whose response times are in the range of µs and which therefore respond 10 to 1000 times faster than conventional nematic liquid-crystal phases.

However, on using ferroelectric liquid crystals, the problem of high susceptibility of the alignment to mechanical stress (shock, impact, pressure, neat distortion, bending and so on) can occur, which can lead to irreversible disruption of the image quality of a display. Currently, this high susceptibility impedes the construction of flexible ferroelectric LC displays and increases the cost of production of conventional displays, i.e. those with glass or rigid plastic plates.

It is advantageous to use polymeric liquid crystals owing to their lower deformability and better processibility.

Although polymeric liquid crystals have already been described on several occasions (for example J. Polym. Sci. Polym. Lett. Ed. 13,243 (1975); Polym. Bull. 6, 309 (1982)), the polymeric liquid crystals which have been described up till now have response times which are too long for practical purposes.

Ferroelectric, quick-response polymeric liquid crystals should therefore be particularly suitable for the production of flexible displays.

It would be particularly advantageous to produce a display film by a continuous process in which quick-response polymeric ferroelectric liquid crystals are incorporated. EP-0,228,703 employed a comprehensive general formula to describe a large number of ferroelectric, liquid-crystalline polymers. However, the response times of the examples mentioned were between 10 and 100 milliseconds.

The present invention accordingly provides ferroelectric, polymeric liquid crystals which fall within the general claim of the said application, but which contain in each side chain of the polymer as a particular structural feature a chiral carbon atom which is directly bonded via an oxygen atom to the phenyl ring of the mesogen. The polymers according to the invention have response times which are significantly shorter than those mentioned in EP-0,228,703.

SUMMARY OF THE INVENTION

The novel polymers are composed of repeating units of the formula (I):

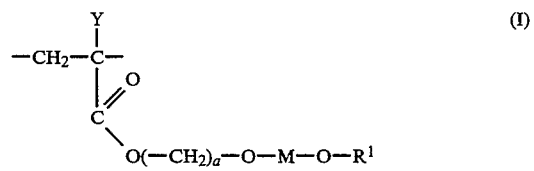

in which
Y=H or CH$_3$
a=an integer from 6 to 12
M=a group selected from the formulae which follow

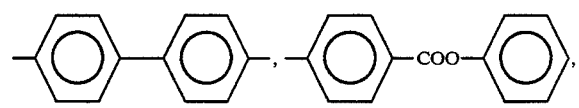

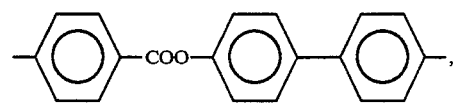

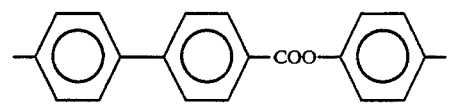 and

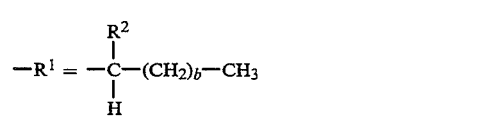

where —R$^2$=—CH$_3$ or —Cl and b=an integer from 1 to 10. Here, preference is given to a ferroelectric, liquid-crystalline polymer in which
Y=H and
R$^2$=CH$_3$
and a, b and R$^1$ have the meanings given above.

DESCRIPTION OF THE PREFERRED EMBODIMENTS

The surprisingly short response times of the polymers according to the invention are due to the fact that the polymers themselves or the polymers mixed with other LC components form an orthogonal smectic phase and an electroclinic splitting is possible in this phase.

The electroclinic effect in the chiral smectic A phase ($S^*_A$ phase), which effect can be used for light modulation (S. Garoff and R. B. Meyer, Phys. Rev. Lett. 38, 848 (1977)), has been known for some years. If an electric field is applied parallel to the layers of a chiral $S_A$ phase ($S^*_A$ phase) the molecules in the in itself orthogonal phase are tilted. The tilt angle $\theta$ between the director n and the layer normals z is proportional to the applied field E. The electroclinic coefficient ($d\,\theta\!:\,d\,E$) gives the strength of the linear coupling between the tilt coordinate and the field.

The electrooptical effect of ferroelectric liquid crystals can be utilized in the "bookshelf arrangement" proposed by Clark and Lagerwall (N. A. Clark and S. T. Lagerwall, Appl. Phys. Lett. 36, 899 (1980)). Characteristics of these crystals such as bistability, spontaneous polarization and phase twisting are incompatible with the orthogonal phases discussed here. The electroclinic effect is exerted initially on a monostable state in field-free space and, on a field being applied, gives a linear electrooptical characteristic at small angles and a slightly curved characteristic at large angles. By contrast, ferroelectric response has a markedly nonlinear characteristic. The electroclinic effect can be interpreted as a continuously field-controlled deflection of the tilt angle.

Since use can be made of the electroclinic effect for rapid response in a liquid-crystalline medium, the polymers according to the invention which are composed of repeating units of the formula (I) are suitable for use in electrooptical switch and display elements. Not only the pure polymer but also a mixture containing the polymer can be used for this purpose.

The compounds are prepared by free-radical polymerization of monomers of the formula (II)

$$CH_2=C{\overset{\displaystyle Y}{\underset{\displaystyle COO(-CH_2)_a-O-M-O-R^1}{\Big<}}}$$

The monomers can be prepared by known methods.

EXAMPLE 1

Preparation of the monomer a) 0.1 mol of the compound of the formula HO—(CH$_2$)$_{11}$—OH were reacted under continous perforation for a period of 24 h at 85° C. with 0.2 mol of HBr (48% strength solution) in 300 ml of petroleum ether (b.p. 80 –120° C.). Evaporating off the solvent and distilling through a bulb tube gave the compound of the formula HO—(CH$_2$)$_{17}$—Br     (I)

in a yield of 80%.

b) 0.05 mol of the compound I and 0.05 mol of p-hydroxybenzoic acid were stirred in 250 ml of water and in the presence of 0.1 mol of KOH and 1 mol % of potassium iodide for 48 h at an oil-bath temperature 100° C. The mixture was then cooled and acidified using 10% strength HCl The precipitated product of the formula

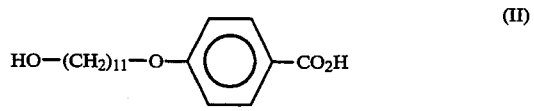

was filtered off and recrystallized from acetone. The yield was 68%.

c) 0.03 mol of the compound II was dissolved in 200 ml of tetrahydrofuran and 0.05 mol of triethylamine and 0.05 mol of acryloyl chloride was added dropwise at 0° to 20° C. Stirring was continued for 2 h at room temperature, 50 ml of water were added and the mixture was extracted 3 times using 70 ml portions of CH$_2$Cl$_2$. Drying over MgSO$_4$ and evaporating off the dichloromethane gave the compound of the formula

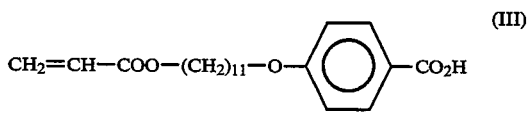

which was recrystallized from an ether/petroleum ether mixture, yield 71%.

d) 30 mmol of 4,4′-dihydroxybiphenyl were dissolved in 120 ml of CH$_2$Cl$_2$ and 42 mol of dimethylamine. To this solution, 42 mmol of trimethylchlorosilane were added dropwise at room temperature and the mixture was subsequently stirred for 1 h. Then 20 mol of the compound III dissolved in 50 ml of CH$_2$Cl$_2$ were added, followed by a solution of 20 mmol of dicyclohexylcarbodiimide and 3 mmol of dimethylaminopyridine in CH$_2$Cl$_2$. The mixture was subsequently stirred for 26 h at room temperature. The precipitate was filtered off under suction and recrystallized from ethanol which had been weakly acidified using hydrochloric acid. Yield: 40% of the compound of the formula

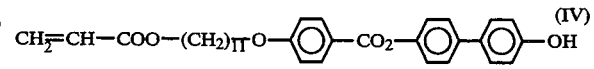

e) 5 mmol of diethyl azodicarboxylate were added slowly dropwise at 0°–5° C. with stirring and with the exclusion of moisture to a solution of 5 mmol of the compound IV, 5 mmol of the compound of the formula HO—CHCH$_3$—C$_6$H$_{13}$, and 5 mmol of triphenylphosphine in 50 ml of tetrahydrofuran. The mixture was subsequently stirred for a further 30 minutes at 0°–5° C. and for 48 h at room temperature. Then the solvent was evaporated off and 10 ml of CH$_2$Cl$_2$ were added to the residue, this mixture was filtered and the filtrate was purified by chromatography on 60 g of silica gel using dichloromethane/petroleum ether 1:1 as the eluent. Evaporation of the solvent from the eluate gave the compound of the formula

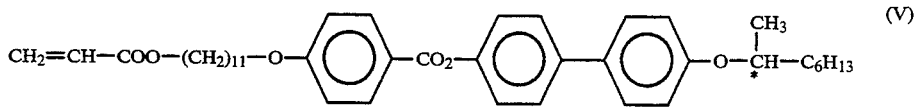

Yield: 55%.

The monomer (V) has the following phase transition temperatures:
K 57.1 $S_x$ 62.2 $S_c$* 75.4 $S_A$ 92.3 N* 93.3 $BP_I$ 95.3 $BP_{II}$ 95.4 I Polymerization 2 mmol of the compound V were dissolved in 10 ml of absolute tetrahydrofuran. Nitrogen was introduced for 10 minutes and then a solution of 0.02 mmol of azoisobutyronitrile in tetrahydrofuran was added. The mixture was stirred for 8 hours at 60° C. under an atmosphere of nitrogen. The resulting polymer can be worked up by reprecipitation 8 to 10 times with methanol from a solution in tetrahydrofuran (yield: 58%), but it is also possible to separate the polymer into fractions having different average molecular weights by chromatography.

The polymer Ia has an average molecular weight $M_W$=210,000 (relative to the polystyrene standard), and a molecular dispersity $E=M_W/M_n=3.09$. This polymer has the following phase transition temperatures:

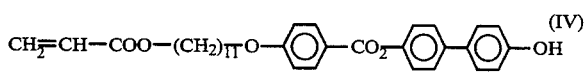

$T_G$ 50 $S_B$ 92 $S_x$ 125 $S_c$* 142 $S_A$ 151

The response time of this polymer at a temperature of 137° C. and a voltage of 10 volts (2 ηm cell) is 7milliseconds. At a temperature of 125° C., the response time at 10 to 40 volts is constant at 1 millisecond electroclinic mode).

The polymer Ib has an average molecular weight $M_W$=15,000 and a molecular dispersity $E=M_W/M_n=1.50$.

This polymer has the following phase transition temperatures:
$T_G$ 50 $S_B$ 92 $S_x$ 123 $S_c$* 142 $S_A$ 146 I At temperatures of between 130° C. and 140° C., the response time is 220 to 392 microseconds. An electroclinic mode is observed at 117° to 123° C.

EXAMPLE 2

Preparation of the Monomer a) 30 mmol of 4,4'-dihydroxybiphenyl were dissolved in 150 ml of tetrahydrofuran and 42 mmol of diethylamine. To this solution at room temperature were added dropwise 42 mmol of trimethylchlorosilane and the mixture was then stirred for 1 h. Then 20 mmol of the compound II, (cf. Example 1a) and 1b)) dissolved in 50 ml of $CH_2 Cl_2$ were added to the mixture followed by a solution of 20 mmol of dicyclohexylcarbodiimide and 3 mmol of dimethylaminopyridine in $CH_2Cl_2$. Stirring was continued for a further 26 h at room temperature. The precipitate was filtered off under suction and recrystallized from ethanol which had been weakly acidified using hydrochloric acid.

Yield: 40% of the compound of the formula

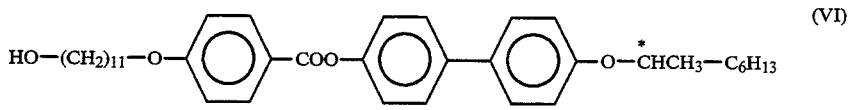

Yield : 52%.

b) 5 mmol of the phenol component IV were reacted with 5 mmol of the alcohol component of the formula HO—$CHCH_3$—$C_6H_{13}$ under the same conditions as described in Example 1e). This gave a yield of 55% of the compound of the formula

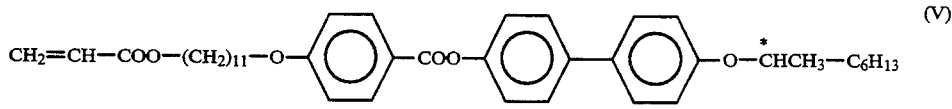

c) 2.5 mmol of the compound VI were dissolved in 20 ml of tetrahydrofuran and 5 mmol of triethylamine and reacted under the conditions described in Example 1c with 5 mmol of acryloyl chloride. Yield: 80% of the compound of the formula (V)

$CH_2=CH-COO-(CH_2)_{11}-O-$⟨phenyl⟩$-COO-$⟨phenyl⟩$-$⟨phenyl⟩$-O-\overset{*}{C}HCH_3-C_6H_{13}$ Polymerization This compound V was polymerized as described in Example 1.

We claim:

1. A ferroelectric, liquid-crystalline polymer composed of repeating units of the formula $$\begin{array}{c} Y \\ | \\ -CH_2-C- \\ | \\ C \!\!\diagdown\!\!\!\!\diagup\!\! O \\ O(-CH_2)_a-O-M-O-R^1 \end{array}$$

in which
Y is H,
a is 11,
M is

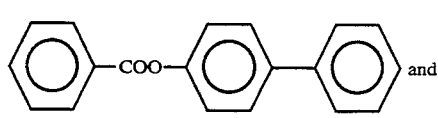 and

-continued
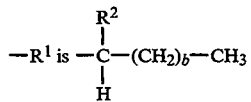
where —$R^2$ is —$CH_3$ and b is 5.
2. An electrooptical switch and display element containing a polymer as claimed in claim 1.
* * * * *